US007851060B2

(12) United States Patent
Baker et al.

(10) Patent No.: US 7,851,060 B2
(45) Date of Patent: *Dec. 14, 2010

(54) LABEL ASSEMBLY FOR PROCESS EQUIPMENT AND METHOD OF APPLYING THE SAME

(75) Inventors: Kenneth D Baker, Ambler, PA (US); Michael C. Needling, Norristown, PA (US)

(73) Assignee: NewAge Industries, Inc., Southampton, PA (US)

( * ) Notice: Subject to any disclaimer, the term of this patent is extended or adjusted under 35 U.S.C. 154(b) by 1164 days.

This patent is subject to a terminal disclaimer.

(21) Appl. No.: 11/410,709

(22) Filed: Apr. 25, 2006

(65) Prior Publication Data

US 2007/0026208 A1 Feb. 1, 2007

Related U.S. Application Data

(60) Provisional application No. 60/674,532, filed on Apr. 25, 2005.

(51) Int. Cl.
*B32B 7/12* (2006.01)
*B32B 15/04* (2006.01)
*G06G 17/00* (2006.01)
*G06F 7/00* (2006.01)
*G06K 7/08* (2006.01)

(52) U.S. Cl. ....................... 428/343; 428/354; 235/375; 235/451; 235/376

(58) Field of Classification Search ................. 428/343, 428/354; 156/60; 235/375, 451, 376
See application file for complete search history.

(56) References Cited

U.S. PATENT DOCUMENTS 3,240,731 A * 3/1966 Nitzsche et al. ............. 524/863
6,660,396 B1 12/2003 Warburton-Pitt

* cited by examiner

*Primary Examiner*—Victor S Chang
(74) *Attorney, Agent, or Firm*—Volpe and Koenig, P.C.

(57) ABSTRACT

A label assembly for application on a piece of process equipment is provided. The label assembly includes a label positioned on the piece of process equipment. A layer of generally transparent silicone coats the process equipment over the label. At least one layer of generally transparent tape covers the layer of silicone over the label. A method for providing a label assembly is also provided.

13 Claims, 2 Drawing Sheets

LABEL ASSEMBLY FOR PROCESS EQUIPMENT AND METHOD OF APPLYING THE SAME

CROSS REFERENCE TO RELATED APPLICATION(S)

This application claims the benefit of U.S. provisional application No. 60/674,532, filed Apr. 25, 2005, which is incorporated by reference as if fully set forth.

BACKGROUND

Labels used in industrial environments to identify process equipment are frequently exposed to adverse conditions. General operations including cleaning and maintenance expose such labels to temperature extremes, moisture, and harsh chemicals. Even in non-industrial environments, labels used on consumer devices such as automobiles, appliances, and temperature control systems are subject to severe conditions. These conditions often lead to the destruction of labels attached to process equipment, or render such labels indecipherable.

It would be desirable to provide a label for use in harsh environments on process equipment which could withstand harsh environments while maintaining its readability. A method for applying such labels in the field on existing installed equipment is also desired.

SUMMARY

The present invention provides a label assembly for application on a piece of process equipment is provided. The label assembly includes a label positioned on the piece of process equipment. A layer of generally transparent silicone coats the process equipment over the label. At least one layer of generally transparent tape covers the layer of silicone over the label.

The present invention also provides a kit adapted to affix a label assembly to a piece of process equipment. The kit includes a label for positioning on the piece of process equipment and a layer of generally transparent silicone for coating onto the process equipment over the label. A film applicator is configured to apply the coating of generally transparent silicone over the label. The film applicator includes a squeegee having a front edge and a recess positioned on a bottom surface of the squeegee, and a handle attached to a top surface of the squeegee. The kit further includes at least one layer of generally transparent tape for covering the layer of silicone over the label.

The present invention also provides a method for providing a label assembly. A piece of process equipment is provided and a label is positioned on a surface of the piece of process equipment. A layer of generally transparent curable liquid silicone is coated on the process equipment over the label. At least one layer of generally transparent tape is applied on the process equipment over the silicone, and the curable silicone is cured.

BRIEF DESCRIPTION OF THE DRAWING(S)

The foregoing Summary and the following detailed description will be better understood when read in conjunction with the following drawings, which illustrate preferred embodiments of the invention. In the drawings.

Figure 4:
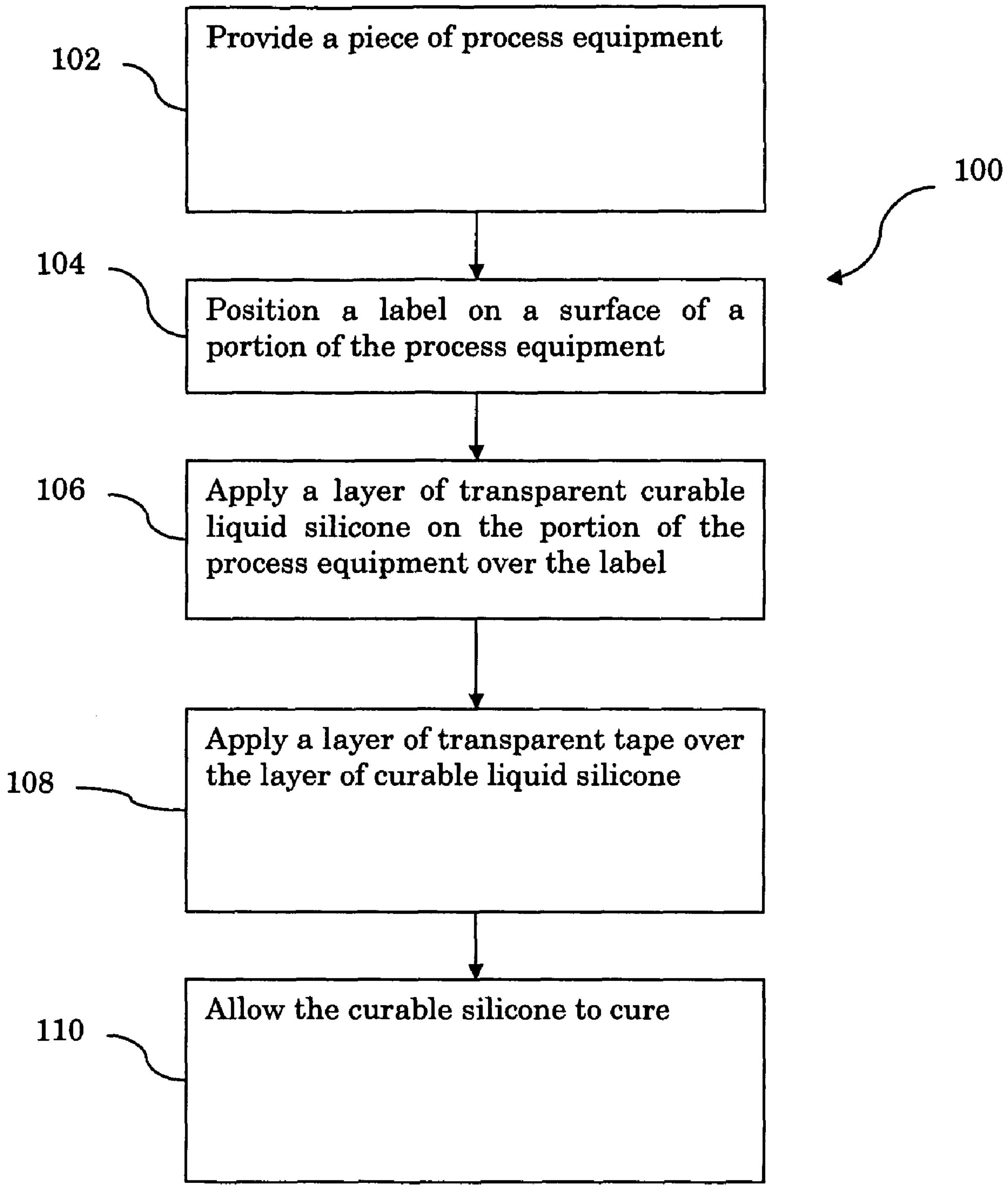

FIG. 4 a flow chart depicting a preferred method for installing a label assembly.

DETAILED DESCRIPTION OF THE PREFERRED EMBODIMENT(S)

Certain terminology is used in the following description for convenience only and is not considered limiting. Words such as “front,” “back,” “top,” and “bottom” designate directions in the drawings to which reference is made. This terminology includes the words specifically noted above, derivatives thereof, and words of similar import. Additionally, the terms “a” and “one” are defined as including one or more of the referenced item unless specifically noted.

The preferred embodiments of the present invention are described below with reference to the drawing figures where like numerals represent like elements throughout.

Figure 2:
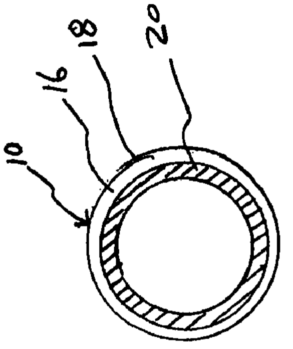
FIG. 2 is a section view of the label assembly through line 2-2 of FIG. 1.
Figure 1:
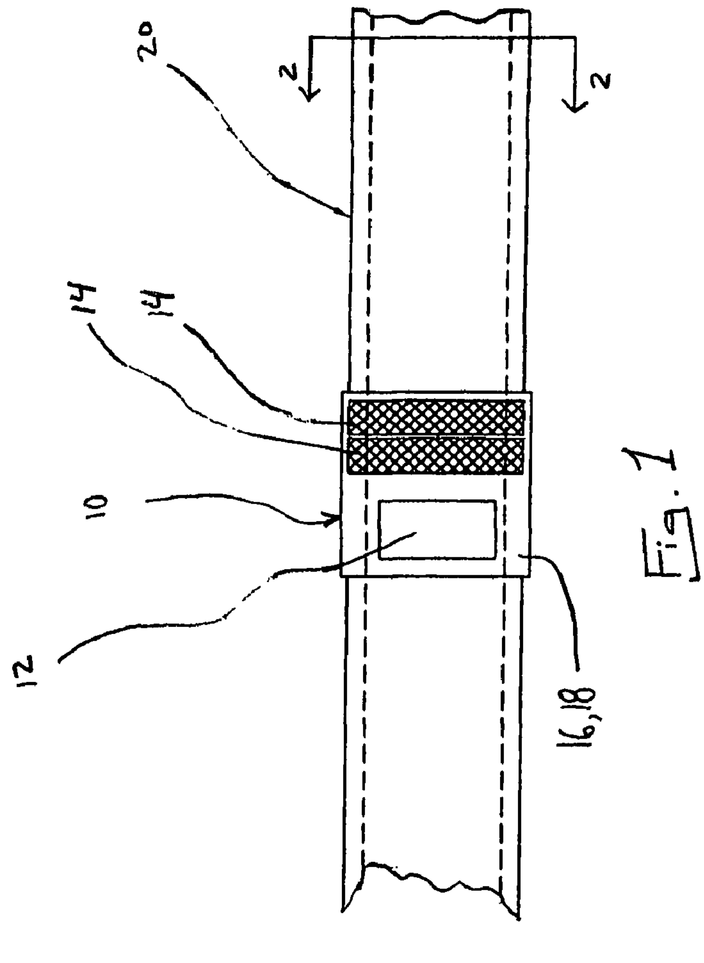
FIG. 1 is a plan view of a label assembly installed on a portion of process equipment according to a preferred embodiment of the present invention.

Referring to FIGS. 1 and 2, a label assembly 10 according to a preferred embodiment of the present invention is shown. The label assembly 10 is shown installed on a portion of process equipment 20. The process equipment 20 can be a flexible hose, a rigid tube, a structural bar, or any piece of process equipment where identification for tracking is desired.

The label assembly 10 includes a label 12 located in contact with the process equipment 20 for identification. The label 12 can include any suitable communication including written numbers, words, bar codes or other human or machine readable symbology. The label 12 is preferably formed of a polymer material imprinted with a high-temperature permanent ink. For example, a biaxially-oriented polyethylene terephthalate (BOPET) polyester film, such as Mylar®, imprinted with a curable resin ink would be preferable. Alternatively, any durable high-temperature plastic or metallic film or sheet imprinted with temperature resistant ink may be used. The label 12 preferably includes an adhesive backing for attachment to the process equipment 20. Optionally, the label 12 can also include a reflective backing to resist heat radiating from the process equipment 20. Additional indicia such as stripes 14 can be located on the process equipment 20 for further identification. The stripes 14 are also preferably formed of a high-temperature plastic or metallic film or sheet imprinted with high-temperature ink. Moreover, the stripes 14 can include a through-colored polymer to provide identifying color, pattern or indicia without requiring printing.

A curable liquid silicone coating 16 is provided over the label 12 and stripes 14 and over an area in near proximity to the label 12 and stripes 14 on the process equipment 20 to provide a protective barrier. The silicone coating 16 preferably extends about a perimeter of the process equipment 20 in the area that the label 12 is to be applied, as shown in FIG. 2. Alternatively, the silicone coating can be applied to only a section of a surface of the process equipment 20 not extending about the perimeter. The silicone coating 16 is preferably a generally transparent room temperature vulcanization (RTV) silicone sealant allowing the label 12 and stripes 14 to be viewed therethrough. Alternatively, any suitable generally transparent silicone coating can be applied.

Figure 3:
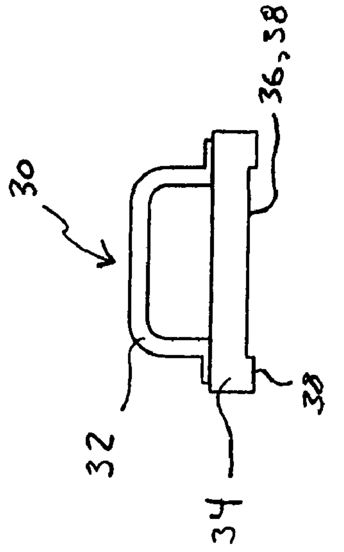
FIG. 3 is an elevation view of a film applicator for use in installing the label assembly of FIG. 1.

A film applicator 30, such as shown in FIG. 3, is useful for applying the layer of silicone coating 16 at a predetermined thickness in a preferred manner. The film applicator 30 includes a handle 32 and a squeegee 34. During silicone application, a bead of silicon can be applied to a front edge 38 of the squeegee and evenly applied to a surface such as the surface of the process equipment 20. The squeegee 34 preferably includes a recess 36 for allowing a layer of silicone coating to build during application. Alternatively, other suitable devices can be used for applying a layer of silicone including a mold, a roller, a sprayer or a pad.

One or more layers of generally transparent tape 18, such as heat curable and or self-fusing silicone tape, is preferably applied over the silicone coating 16 around the perimeter of the process equipment 20 in the area of the label 12. Alternatively, other types of transparent polymer tape may be applied. The generally transparent tape can include translucent tape, or tape which appears translucent prior to application, but once applied to a surface appears generally transparent. In the case where a single layer of transparent tape is applied around a perimeter of a piece of process equipment, the ends of the transparent tape 18 preferably overlap one another. Alternatively, the ends of the transparent tape may butt against one another to assure a smooth transition without overlap. The tape 18 fuses with the silicone coating 16 during curing. Heat will need to be applied via an oven or heat gun for a period of time sufficient to cure the silicone.

The resulting label assembly 10 is resistant to extreme temperatures and a variety of chemicals. Surrounded by the layer of silicone coating 16 and the layer of silicone tape 18, the label 12 and stripes 14 are offered significant protection from solid, fluid, and gaseous contaminants. The assembly is especially resistant to the conditions produced during cleaning and autoclaving of process equipment. Even with the significant protection afforded the label 12 and stripes 14 through their encasement, the label 12, stripes 14 and any other applied indicia remain clearly visible through the transparent silicone coating 16 and the transparent tape 18.

Referring to FIG. 4, a flow chart depicting a method 100 for installing a label assembly according to a preferred embodiment of the present invention is shown. In a step 102, process equipment is provided. A label is positioned on a surface of a portion of the process equipment (step 104). If desired, the label can be adhered to the surface of the process equipment using an applied adhesive such as curable silicone or by providing a label with an adhesive backing. Optionally, indicia in addition to the label can be positioned in proximity to the label. A layer of generally transparent curable liquid silicone is applied on the process equipment over the label (and over any additional indicia provided) and in the area surrounding the label in near proximity to the label (step 106). Preferably, a film applicator including a squeegee is used to evenly distribute the silicone on the process equipment. Preferably a layer of RTV silicone sealant is applied, although any suitable curable silicone liquid can be used. A layer of generally transparent tape, preferably silicone, is applied over the layer of curable liquid silicone (step 108). The tape is preferably applied about a perimeter of the process equipment and pulled tightly over the silicone coating prior to its complete curing, removing trapped air between the silicone coating and the tape. Additional layers of tape may be applied to assure complete coverage of the silicone coating and/or to provide extra protection for the underlying label. The curable liquid silicone is allowed to cure (step 110). If RTV silicone is applied, the step 110 can be performed by merely allowing the liquid silicone coating to be exposed to ambient air. If a heat curable silicone tape is used, heat needs to be applied by an appropriate heat source until the silicone is cured.

While the preferred embodiments of the invention have been described in detail above, the invention is not limited to the specific embodiments described, which should be considered as merely exemplary. Further modifications and extensions of the present invention may be developed, and all such modifications are deemed to be within the scope of the present invention as defined by the appended claims.

What is claimed is:

1. A label assembly for application on a piece of process equipment, the label assembly comprising:

a label positioned on the piece of process equipment;

a layer of generally transparent curable liquid silicone coating the process equipment over the label; and at least one layer of generally transparent tape covering the layer of silicone over the label.

2. The label assembly of claim 1, wherein the label comprises human or machine readable symbology.

3. The label assembly of claim 1, wherein the label comprises a durable, high-temperature plastic or metallic film or sheet.

4. The label assembly of claim 1, wherein the label comprises a polymer material imprinted with a high-temperature permanent ink.

5. The label assembly of claim 4, wherein the polymer material comprises a biaxially-oriented polyethylene terephthalate (BOPET) polyester film and the high-temperature permanent ink comprises a curable resin ink.

6. The label assembly of claim 1, wherein the label comprises an adhesive backing.

7. The label assembly of claim 1, wherein the silicone extends about a perimeter of the process equipment.

8. The label assembly of claim 1, wherein the silicone coating comprises a generally transparent room temperature vulcanization (RTV) silicone sealant.

9. The label assembly of claim 1, wherein the at least one layer of generally transparent tape comprises heat curable and/or self-fusing silicone tape.

10. The label assembly of claim 1, wherein the at least one layer of generally transparent tape is translucent prior to its application and transparent subsequent to its application.

11. The label assembly of claim 1, wherein the at least one layer of generally transparent tape comprises two ends and the tape extends about a perimeter of the process equipment.

12. The label assembly of claim 11, wherein the ends of the at least one layer of generally transparent tape overlap each other.

13. The label assembly of claim 11, wherein the ends of the at least one layer of generally transparent tape abut each other.

* * * * *